United States Patent
Zhang et al.

(10) Patent No.: US 10,929,694 B1
(45) Date of Patent: Feb. 23, 2021

(54) LANE DETECTION METHOD AND SYSTEM BASED ON VISION AND LIDAR MULTI-LEVEL FUSION

(71) Applicant: Tsinghua University, Beijing (CN)

(72) Inventors: Xinyu Zhang, Beijing (CN); Jun Li, Beijing (CN); Zhiwei Li, Beijing (CN); Huaping Liu, Beijing (CN); Zhenhong Zou, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/035,638

(22) Filed: Sep. 28, 2020

(30) Foreign Application Priority Data

Jan. 22, 2020 (CN) .......................... 202010074226.1

(51) Int. Cl.
*G06K 9/00* (2006.01)
*G06K 9/62* (2006.01)
(Continued)

(52) U.S. Cl.
CPC .......... *G06K 9/00798* (2013.01); *G01S 17/86* (2020.01); *G01S 17/931* (2020.01);
(Continued)

(58) Field of Classification Search
CPC ........................... G01S 17/86; G06K 9/00798
See application file for complete search history.

(56) References Cited

U.S. PATENT DOCUMENTS

| | | | |
|---|---|---|---|
| 2019/0163989 A1 | 5/2019 | Tusimple | |
| 2019/0163990 A1* | 5/2019 | Mei ........................ | G01C 21/32 |

FOREIGN PATENT DOCUMENTS

| | | |
|---|---|---|
| CN | 104899855 A | 9/2015 |
| CN | 107576960 A | 1/2018 |

(Continued)

OTHER PUBLICATIONS

Asvadi, Alireza, et al. "Multimodal vehicle detection: fusing 3D-LIDAR and color camera data." Pattern Recognition Letters 115 (2018): 20-29. (Year: 2018).*

(Continued)

*Primary Examiner* — Vincent Rudolph
*Assistant Examiner* — Raphael Schwartz
(74) *Attorney, Agent, or Firm* — Bayramoglu Law Offices LLC

(57) ABSTRACT

A lane detection method based on vision and lidar multi-level fusion includes: calibrating obtained point cloud data and an obtained video image; constructing a point cloud clustering model by fusing height information, reflection intensity information of the point cloud data, and RGB information of the video image, obtaining point clouds of a road based on the point cloud clustering model, and obtaining a lane surface as a first lane candidate region by performing least square fitting on the point clouds; obtaining four-channel road information by fusing the reflection intensity information of the point cloud data and the RGB information of the video image, inputting the four-channel road information into the semantic segmentation network 3D-LaneNet, and outputting an image of a second lane candidate region; and fusing the first lane candidate region and the second lane candidate region, and combining the two lane candidate regions into a final lane region.

10 Claims, 3 Drawing Sheets

(51) Int. Cl.
*G01S 17/931* (2020.01)
*G01S 17/86* (2020.01)

(52) U.S. Cl.
CPC ......... *G06K 9/6218* (2013.01); *G06K 9/6256* (2013.01); *G06K 9/6289* (2013.01)

(56) References Cited

FOREIGN PATENT DOCUMENTS

| | | |
|---|---|---|
| CN | 110232315 A | 9/2019 |
| CN | 110295533 A | 10/2019 |
| CN | 110378196 A | 10/2019 |
| CN | 110532865 A | 12/2019 |
| EP | 3291138 A1 | 3/2018 |

OTHER PUBLICATIONS

Wulff, Florian, et al. "Early fusion of camera and lidar for robust road detection based on U-Net FCN." 2018 IEEE Intelligent Vehicles Symposium (IV). IEEE, 2018. (Year: 2018).*

Yeniaydin, Yasin, and Klaus Werner Schmidt. "Sensor Fusion of a Camera and 2D LIDAR for Lane Detection." 2019 27th Signal Processing and Communications Applications Conference (SIU). IEEE, 2019. (Year: 2019).*

Min Bai et al., Deep Multi-Sensor Lane Detection, May 4, 2019.

Davy Neven et al., Towards End-to-End Lane Detection: an Instance Segmentation Approach, Feb. 15, 2018.

Rui Zhang, Reseach on Polymorphic Object Semantic Segmentation of Complex 3D Scenes based on Laser Point Clouds, a Dissertation Submitted to PLA Strategic Support Force Information Engineering University for the Degree of Doctor of Engineering, Dec. 2018, pp. 1-134.

Zhu Yutong, Lane departure warning algorithm based on fused image and lidar data, Master Dissertation, Nanjing University of Science & Technology, 2016, pp. 1-73.

Junliang Zhang, Road Segmentation Based on Deep Convolutional Neural Network, a Master Thesis Submitted to University of Electronic Science and Technology of China, 2019, pp. 1-70.

\* cited by examiner

US 10,929,694 B1

LANE DETECTION METHOD AND SYSTEM BASED ON VISION AND LIDAR MULTI-LEVEL FUSION

CROSS REFERENCE TO THE RELATED APPLICATIONS

This application is based upon and claims priority to Chinese Patent Application No. 202010074226.1, filed on Jan. 22, 2020, the entire contents of which are incorporated herein by reference.

TECHNICAL FIELD

The present invention relates to the technical field of automatic driving, and more particularly relates to a lane detection method and system based on vision and lidar multi-level fusion.

BACKGROUND

Lane detection in road scenes is a key technical link for self-driven vehicles, it ensures vehicles only travel within the limits of its own lane, not cross to other lanes, which helps to avoid collision with pedestrian or other objects outside its lane. Moreover, lane detection can be used to effectively determine board lines in the effective lane region; driving on the correct lane is a fast and accurate way to achieve safety for self-driven vehicles.

Under normal circumstances, it is relatively easy for human eyes to identify lanes on a road, but certain factors, such as bright light, fog or nighttime, would limit human eyes' ability to identify lanes on a road. These factors also effect self-driven vehicles the same way as they effect human eyes. In order to optimize automatic driving, accurate detection of the lanes on roads despite these factors is required. In most of the lane detection methods that are known in the prior arts, a vehicle-mounted camera is used to obtain dense and high-frequency road, and then the lanes on the road are detected from analyzing these images. However, it is very difficult to accurately detect the lanes due to the shadows, reflections, and small changes of road colors that would affect the images. Besides, it is difficult to obtain spatial information from a single camera image, and the accuracy and stability of multi-camera spatial ranging are also typically very poor, methods that rely on vehicle-mounted cameras cannot meet the high-reliability requirements for self-driven vehicles.

Lidar point clouds are not affected by visible light environments, they can distinguish objects made of different materials, and provide spatial information. In a whole road scene, the road height is generally the lowest among all objects within the scene. Some scholars have used the method of setting a lane height threshold to remove curb-stones, isolation belts, and other objects to detect the lane. However, with respect to an uphill road, the road height is not necessarily the lowest point in the whole road scene, which limits the application of the lane detection method based on a point cloud height threshold. Additionally, the lidar point clouds are sparse and have a relatively low capability in accurate lane detection.

SUMMARY

In order to overcome the shortcoming in the prior art, the objective of the present invention is to provide a lane detection method based on vision and lidar multi-level fusion. The method includes fusing a point cloud of a lidar and an image of a camera to perform lane detection, taking the point cloud as a supplement of spatial information of the image, and using the image to compensate for the disadvantage of low sampling density of the point cloud, which improves the robustness of lane detection algorithms under complex road scenes, such as uphill lanes, uneven illumination, fog, night time, etc.

In order to achieve the above objective, the present invention provides a lane detection method based on vision and lidar multi-level fusion, and the method is implemented by mounting a lidar and a vehicle-mounted camera on a vehicle. The method includes:

calibrating the obtained point cloud data and the obtained video image;

constructing a point cloud clustering model by fusing height information, reflection intensity information of the point cloud data, and red, green, blue (RGB) information of the video image, obtaining point clouds of a road based on the point cloud clustering model, and obtaining a lane surface as a first lane candidate region by performing least square fitting on the point clouds of the road;

obtaining four-channel road information by fusing the reflection intensity information of the point cloud data and the RGB information of the video image, inputting the four-channel road information into a trained semantic segmentation network 3D-LaneNet, and outputting an image of a second lane candidate region; and fusing the first lane candidate region and the second lane candidate region, and combing the two lane candidate regions into a final lane region.

As an improvement to the above method, the step of constructing the point cloud clustering model by fusing the height information, the reflection intensity information of the point cloud data, and the RGB information of the video image, obtaining the point clouds of the road based on the point cloud clustering model, and obtaining the lane surface as the first lane candidate region by performing least square fitting on the point clouds of the road further includes:

constructing the point cloud clustering model based on a constraint:

$$E_i = \alpha(H_i - H_{i+1}) + \beta(Q_i - Q_{i+1}) + \gamma[(R_i - R_{i+1}) + (G_i - G_{i+1}) + (B_i - B_{i+1})],$$

wherein, $E_i$ represents a similarity between an $i^{th}$ point and an $(i+1)^{th}$ point; $\alpha$, $\beta$, and $\gamma$ are weight coefficients; $H_i$ is a height of the $i^{th}$ point in the calibrated point cloud data, and $Q_i$ is a reflection intensity of the $i^{th}$ point in the calibrated point cloud data; and $R_i$, $G_i$, and $B_i$ are RGB three-channel values of an $i^{th}$ pixel in the video image, respectively;

starting clustering by taking a point cloud closest to a central position of a head of the vehicle as a center point and using the point cloud clustering model, wherein when no new point is clustered or after all points in the point cloud are traversed, all point clouds obtained by the final clustering are the point clouds of the road; and performing surface fitting on the point clouds of the road by using a least square method to obtain the lane surface as the first lane candidate region.

As an improvement to the above method, the semantic segmentation network 3D-LaneNet is capable of processing continuous multi-frame information simultaneously and extracting correlation features of a lane from the continuous multi-frame information. The 3D-LaneNet includes twelve 3D-P-Inception modules, wherein six 3D-P-Inception modules are configured for an encode stage, and the other six 3D-P-Inception modules are configured for a decode stage.

The 3D-P-inception modules are obtained by replacing a two-dimensional convolution kernel in Inception-V2 modules with a three-dimensional convolution kernel, and 3D-maxpooling in the 3D-P-Inception modules is replaced with 3D-AvgPooling. Convolution kernels of different sizes are used in the 3D-P-Inception modules to facilitate extraction of multi-scale features of the lane.

As an improvement to the above method, the method further includes: training a semantic segmentation network 3D-LaneNet. The step of training the semantic segmentation network 3D-LaneNet further includes:

creating a dataset as a training set using the calibrated continuous multi-frame point clouds and images;

when consecutive ten frames of data are input, setting ten initial learning rates $a_{j0}=0.001$ for the ten frames of data, respectively, j=1, 2, 3, . . . 10; setting a batch value used for each parameter updating as b=2, and setting the number of times of iterative training as c=5000; calculating a loss function value $L_j$ for each frame of fused data by using a cross entropy loss function, and determining a total loss function value $$L = \sum_{j=1}^{10} L_j;$$

initializing a weight W of the semantic segmentation network 3D-LaneNet by using Gaussian weight to follow a distribution X~N(0, $\sigma^2$), wherein $\sigma^2$ is 1.0, 1.1, . . . , 1.9 for a weight of each frame of data, respectively; and initializing a bias b of each frame of data to 0;

inputting samples of the training set into the 3D-LaneNet, and after completing an $n^{th}$ iterative training, calculating a ratio $$\alpha_n = L_{jn} / L_n$$

of each loss function to a total loss function, wherein $L_{jn}$ is a $j^{th}$ loss function in the $n^{th}$ iterative training, and $L_n$ is the total loss function; if $\alpha_n > 0.3$, updating a learning rate to $a_{jn}=a_{j0}*(1+\alpha_n)$, and if $\alpha_n < 0.03$, updating the learning rate to $a_{jn}=a_{j0}*(1-10\alpha_n)$; and after convergence of network parameters, obtaining the trained semantic segmentation network 3D-LaneNet.

As an improvement to the above method, the step of obtaining the four-channel road information by fusing the reflection intensity information of the point cloud data and the RGB information of the video image, inputting the four-channel road information into the trained semantic segmentation network 3D-LaneNet, and outputting the image of the second lane candidate region further includes:

representing the RGB information of the $i^{th}$ pixel of the video image by $(R_i, G_i, B_i)$, and performing data standardization by using a Min-Max standardization method to obtain standardized RGB information $(R_i', G_i', B_i')$;

performing data standardization on the reflection intensity of the point cloud data by using a z-score standardization method to obtain standardized reflection intensity $Q_i'$ of the $i^{th}$ point in the point cloud data; and fusing the reflection intensity as fourth-channel information and the RGB three-channel information of the image to obtain the four-channel road information $(R_i', G_i', B_i', Q_i')$.

The present invention further provides a lane detection system based on vision and lidar multi-level fusion. The system includes a lidar, a vehicle-mounted camera, and a lane detection module. The lane detection module includes a semantic segmentation network 3D-LaneNet, a calibration unit, a first lane candidate region detection unit, a second lane candidate region detection unit, and a lane fusion unit.

The lidar is configured to obtain point cloud data.

The vehicle-mounted camera is configured to obtain a video image.

The calibration unit is configured to calibrate the obtained point cloud data and the obtained video image.

The first lane candidate region detection unit is configured to construct a point cloud clustering model by fusing height information, reflection intensity information of the point cloud data, and RGB information of the video image, obtain point clouds of a road based on the point cloud clustering model, and obtain a lane surface as a first lane candidate region by performing least square fitting on the point clouds of the road.

The second lane candidate region detection unit is configured to obtain four-channel road information by fusing the reflection intensity information of the point cloud data and the RGB information of the video image, input the four-channel road information into the semantic segmentation network 3D-LaneNet, and output an image of a second lane candidate region.

The lane fusion unit is configured to fuse the first lane candidate region and the second lane candidate region, and combine the two lane candidate regions into a final lane region.

As an improvement to the above system, the first lane candidate region detection unit is implemented as follows:

the point cloud clustering model is constructed based on a constraint:

$$E_i = \alpha(H_i - H_{i+1}) + \beta(Q_i - Q_{i+1}) + \gamma[(R_i - R_{i+1}) + (G_i - G_{i+1}) + (B_i - B_{i+1})],$$

wherein, $E_i$ represents a similarity between an $i^{th}$ point and an $(i+1)^{th}$ point; $\alpha$, $\beta$, and $\gamma$ are weight coefficients; $H_i$ is a height of the $i^{th}$ point in the calibrated point cloud data, and $Q_i$ is a reflection intensity of the $i^{th}$ point in the calibrated point cloud data; and $R_i$, $G_i$, and $B_i$ are RGB three-channel values of an $i^{th}$ pixel in the video image, respectively;

clustering starts by taking a point cloud closest to a central position of a head of the vehicle as a center point and using the point cloud clustering model, wherein when no new point is clustered or after all points in the point cloud are traversed, all point clouds obtained by the finally clustering are the point clouds of the road; and surface fitting is performed on the point clouds of the road by using a least square method to obtain the lane surface as the first lane candidate region.

As an improvement to the above system, the semantic segmentation network 3D-LaneNet is capable of processing continuous multi-frame information simultaneously and extracting correlation features of a lane from the continuous multi-frame information. The 3D-LaneNet includes twelve 3D-P-Inception modules, wherein six 3D-P-Inception modules are configured for an encode stage, and the other six 3D-P-Inception modules are configured for a decode stage. The 3D-P-inception modules are obtained by replacing a two-dimensional convolution kernel in Inception-V2 modules with a three-dimensional convolution kernel, and 3D-maxpooling in the 3D-P-Inception modules is replaced with 3D-AvgPooling. Convolution kernels of different sizes are used in the 3D-P-Inception modules to facilitate extraction of multi-scale features of the lane.

As an improvement to the above system, the semantic segmentation network 3D-LaneNet is trained as follows:

a dataset is created as a training set using the calibrated continuous multi-frame point clouds and images;

when consecutive ten frames of data are input, ten initial learning rates $a_{j0}=0.001$ are set for the ten frames of data, respectively, j=1, 2, 3, . . . 10; a batch value used for each parameter updating is set as b=2, and the number of times of iterative training is set as c=5000; a loss function value $L_j$ for each frame of fused data is calculated by using a cross entropy loss function, and a total loss function value $$L = \sum_{j=1}^{10} L_j$$

is determined; a weight W of the semantic segmentation network 3D-LaneNet is initialized by using Gaussian weight to follow a distribution X~N(0, $\sigma^2$), wherein $\sigma^2$ is 1.0, 1.1, . . . , 1.9 for a weight of each frame of data, respectively; and a bias b of each frame of data is initialized to 0;

samples of the training set are input into the 3D-LaneNet, and after completing an $n^{th}$ iterative training, a ratio $$\alpha_n = L_{jn} / L_n$$

of each loss function to a total loss function is calculated, wherein $L_{jn}$ is a $j^{th}$ loss function in the $n^{th}$ iterative training, and $L_n$ is the total loss function; if $\alpha_n>0.3$, a learning rate is updated to $a_{jn}=a_{j0}*(1+\alpha_n)$, and if $\alpha_n<0.03$, the learning rate is updated to $a_{jn}=a_{j0}*(1-10\alpha_n)$; and after convergence of network parameters, the trained semantic segmentation network 3D-LaneNet is obtained.

As an improvement to the above system, the second lane candidate region detection unit is implemented as follows:

the RGB information of the $i^{th}$ pixel of the video image is represented by $(R_i,G_i,B_i)$, and data standardization is performed by using a Min-Max standardization method to obtain standardized RGB information $(R_i',G_i',B_i')$;

data standardization is performed on the reflection intensity of the point cloud data by using a z-score standardization method to obtain standardized reflection intensity $Q_i'$ of the $i^{th}$ point in the point cloud data; and the reflection intensity as fourth-channel information and the RGB three-channel information of the image are fused to obtain the four-channel road information $(R_i', G_i', B_i', Q_i')$.

Compared with the prior art, the advantages of the present invention are as follows.

1. The accuracy of lane detection in complex road scenes is improved by the fully fused point clouds of the lidar and images of the vehicle-mounted camera, using the two kinds of data to complement each other.

2. Detection of the lane in an uphill lane is much more accurate by fusing the point cloud data of the lidar and the image information of the vehicle-mounted camera in a clustering.

3. The present invention uses correlation of a lane in continuous frame data to detect the lane, thereby improving the robustness and stability of the algorithm performance.

DETAILED DESCRIPTION OF THE EMBODIMENTS

In order to meet the objectives that are stated above and provide technical solutions, the present invention is described in detail below with reference to the drawings and embodiments. It should be understood that the specific embodiments described herein are used only to explain the present invention rather then limiting the present invention.

In complex scenes, to solve the problem of low accuracy in lane detection by merely using a vehicle-mounted camera or a lidar, a novel idea is to fuse information of various sensors to improve the capability to perceive the road environment around a vehicle. However, most of these methods are limited only to perform either lane detection by lidar point clouds or camera images separately, and then fuse the detection results, which does not make full use of a complementary effect of information between the two kinds of sensor data. Moreover, lidar point clouds and camera images are all continuous time series data, and lanes in adjacent continuous data are correlated to some extent, while the prior arts do not perform extraction and use on the correlation information nearly.

Figure 1:
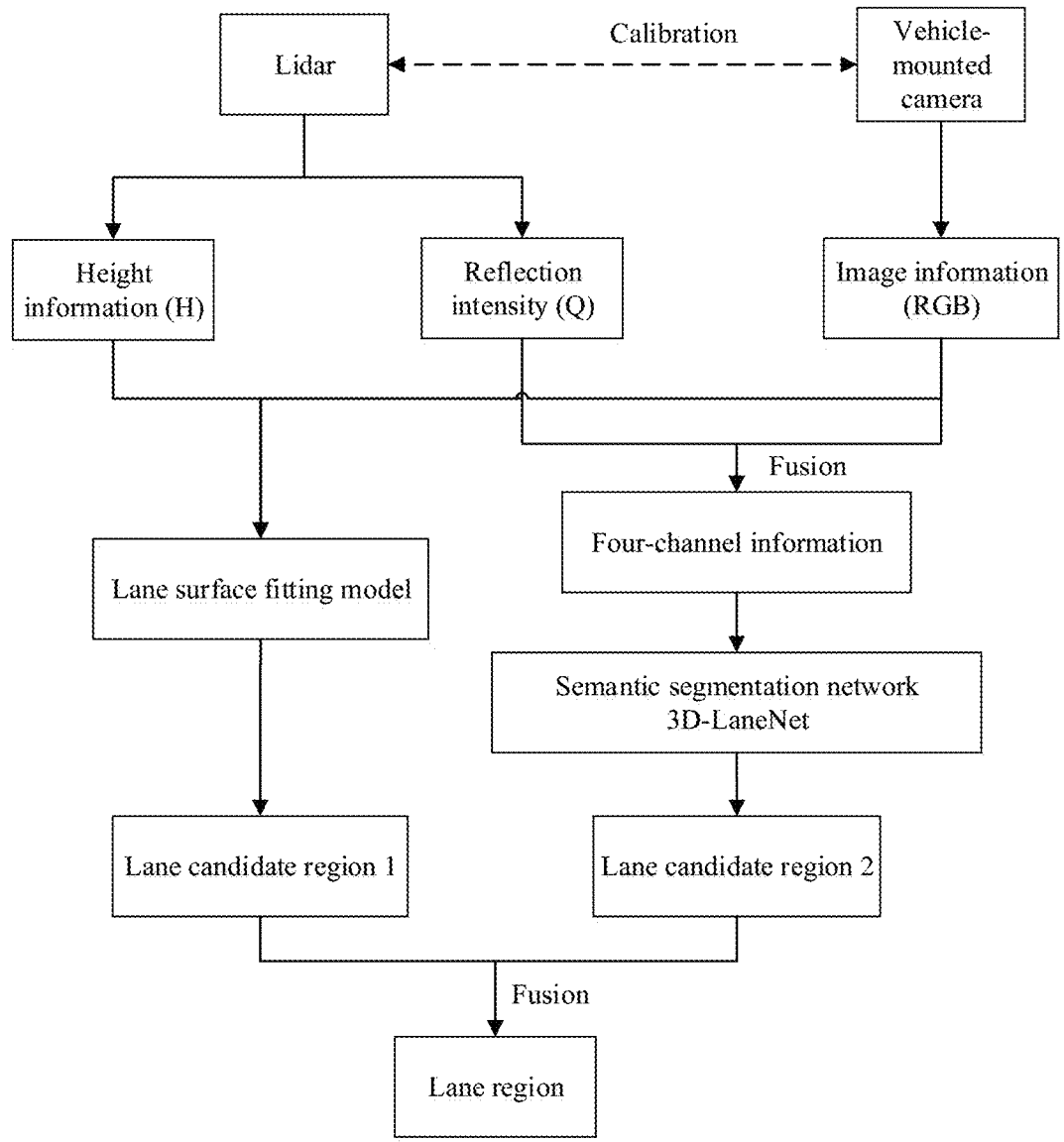
FIG. 1 is a flow chart of a lane detection method based on vision and lidar multi-level fusion according to an embodiment of the present invention.

As shown in FIG. 1, the present invention provides a lane detection method based on vision and lidar multi-level fusion, including the following steps.

Step 1): point cloud data are obtained through a lidar, a video image is obtained through a vehicle-mounted camera, the point cloud data and the video image are calibrated to enable the point cloud data correspond to spatial coordinates of the video image identically, each point in the point cloud data and each pixel in the video image represent an identical coordinate position in an actual road scene. The $i^{th}$ point in the point cloud data has a height of $H_i$ and a reflection intensity of $Q_i$. Color information of the $i^{th}$ pixel of the video image is $(R_i,G_i,B_i)$.

Step 2): height information, reflection intensity information of the point cloud of the lidar, and image information of the camera are fused, point clouds of a road are obtained based on a point cloud clustering model, and a lane surface is obtained as the lane candidate region 1 by performing least square fitting on the point clouds of the road.

Step 2a): heights, reflection intensities, and RGB values of the point cloud do not change significantly in a local small range of similar objects, and a point cloud clustering model based on a constraint is constructed:

$E_i=\alpha(H_i-H_{i+1})+\beta(Q_i-Q_{i+1})+\gamma[(R_i-R_{i+1})+(G_i-G_{i+1})+(B_i-B_{i+1})]$, wherein, $\alpha$, $\beta$, and $\gamma$ are weight coefficients; $E_i$ represents a similarity between the $i^{th}$ point and the $(i+1)^{th}$ point. A similarity value of two points of an identical type is 0 or close to 0, and on this basis, it is also possible to determine whether two points in the point cloud data belong to the identical type of objects or not. That is, the possibility of the two points belonging to the identical type of objects increases as the similarity value of the two points approaches to 0 increasingly.

Step 2b): clustering starts by taking the point cloud closest to a central position of a head of the vehicle as a center point, and when no new point is clustered or after all points in the point cloud are traversed, all point clouds obtained by the final clustering are the point clouds of the road.

Step 2c): surface fitting of point clouds: surface fitting is performed on the point clouds of the road by using a least square method to obtain the lane surface as the lane candidate region 1.

Step 3): the reflection intensity of the point cloud data of the lidar and the RGB information of the video image are fused to obtain four-channel road information. The four-channel road information is input into a semantic segmentation network 3D-LaneNet, and an image of the lane candidate region 2 is output. Step 3) includes the following additional steps.

Step 3a): the RGB information of the $i^{th}$ pixel of the video image is represented by $(R_i, G_i, B_i)$, and data standardization is performed by using a Min-Max standardization method to obtain standardized RGB information $(R_i', G_i', B_i')$.

Step 3b): data standardization is performed on the reflection intensity of the point cloud data by using a z-score standardization method to obtain standardized reflection intensity $Q_i'$ of the $i^{th}$ point in the point cloud data.

Step 3c): the reflection intensity as fourth-channel information and the RGB three-channel information of the image are fused to obtain the four-channel road information $(R_i', G_i', B_i', Q_i')$.

Step 3d): the semantic segmentation network 3D-LaneNet is established and trained.

Figure 2:
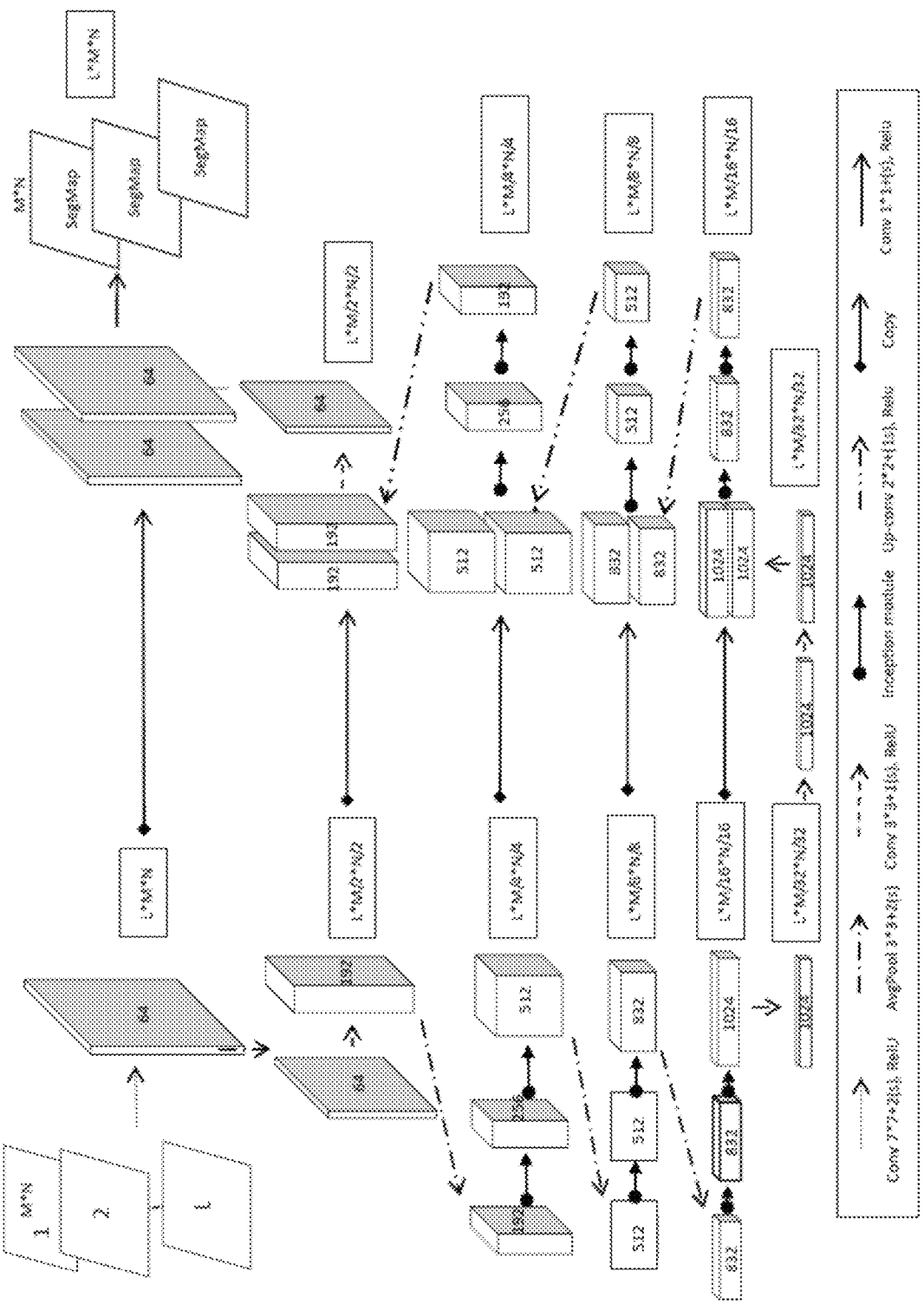
FIG. 2 is a schematic view of the network structure of the 3D-LaneNet according to an embodiment of the present invention.

FIG. 2 is a structural view showing the semantic segmentation network 3D-LaneNet of the present invention, which mainly includes network structure design, model training, and model testing. It should be noted that the hardware and software platforms for construction, training, and testing of the 3D-LaneNet are Ubuntu18.04+TITAN RTX+Tensorflow-gpu1.9+Cuda10.1+Cudn7.5+Python3.6.

The network structure design includes the following main steps.

1) Similar to a traditional semantic segmentation network, the structure of the 3D-LaneNet is divided into symmetrical encoder and decoder. The encoder is designated to learn lane features from the input data, while the decoder performs up-sampling by deconvolution and generates segmentation results according to the features learned by the encoder.

Figure 3:
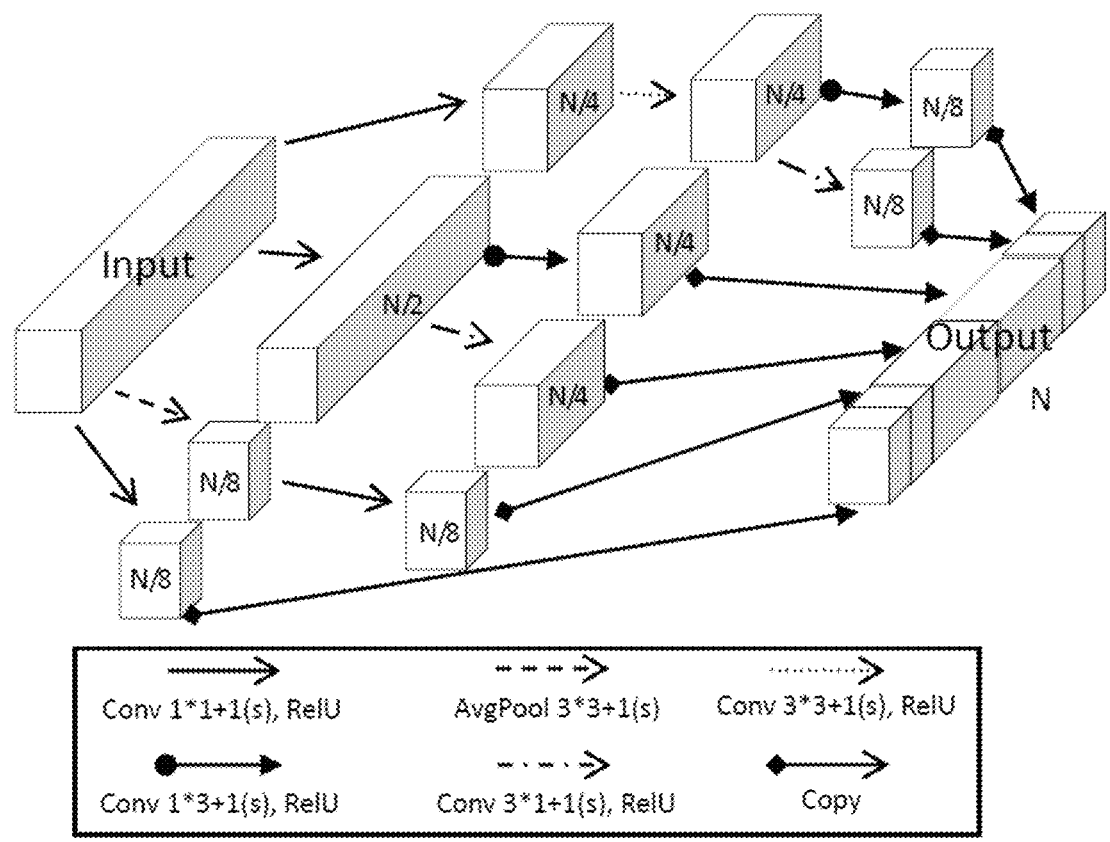
FIG. 3 is a schematic view of a 3D-P-Inception module according to an embodiment of the present invention.

2) The 3D-P-inception modules are formed by replacing a two-dimensional convolution kernel in the Inception-V2 modules with a three-dimensional convolution kernel, as shown in FIG. 3. In the image, the lane color is generally dark and its RGB values are small, while MaxPooling easily discards lane information with small values, and AvgPooling results are affected by all values in local regions and have the relatively high retention of lane feature information. Therefore, 3D-maxpooling is replaced with 3D-AvgPooling in the 3D-P-Inception modules. The width and length of a lane are not fixed, and convolution kernels of different sizes are used in the 3D-P-Inception modules to facilitate extraction of multi-scale features of the lane and significantly reduce network parameters.

3) The three-dimensional semantic segmentation network 3D-LaneNet is constructed based on 3D-P-Inception. The 3D-LaneNet is capable of processing continuous multi-frame information simultaneously and extracting correlation features of the lane from the continuous multi-frame information. Considering the limited training data and the requirement of processing multi-frame fusion information simultaneously each time, the 3D-LaneNet includes twelve 3D-P-Inception modules, wherein six 3D-P-Inception modules are configured for an encode stage, and the other six 3D-P-Inception modules are configured for a decode stage, which avoids over-fitting of the model caused by an excessively deep network, reduces the number of parameters and improves the real-time computing capacity of the network. It should be noted that, with respect to Q, a compensation coefficient α is required to be learned when the semantic segmentation network 3D-LaneNet is trained the present invention.

The model training includes the following main steps (by taking simultaneous processing of consecutive ten frames of data as an example).

1) Production of a dataset: the dataset is created using the calibrated continuous multi-frame point clouds and image files.

2) Setting of hyper-parameters: ten initial learning rates $a_i=0.001$ are set for the input consecutive ten frames of data, respectively, i=1, 2, 3, . . . 10, so that each frame of data has its own learning rate. A batch value used for each parameter updating is set as b=2, and the number of times of iterative training is set as c=5000.

3) Setting of a loss functions: a loss function value $L_j$ is calculated for each frame of fused data by using a cross entropy loss function, j=1, 2, 3, . . . 10, and a total loss function value $$L = \sum_{j=1}^{10} L_j$$

is determined.

4) Updating of the learning rate: after the $n^{th}$ iterative training is completed, a ratio $$\alpha_n = L_{jn} / L_n$$

of each loss function to a total loss function is calculated, wherein $L_{jn}$ is the $j^{th}$ loss function in the $n^{th}$ iterative training, and $L_n$ is the total loss function. If $\alpha_n > 0.3$, then the learning rate is updated to $a_{jn} = a_{j0}*(1+\alpha_n)$ and if $\alpha_n < 0.03$, then the learning rate is updated to $a_{jn} = a_{j0}*(1-10\alpha_n)$.

5) Initialization of a weight and a bias: the weight W is initialized by using Gaussian weight to follow the distribution X~N(0, $\sigma^2$), wherein $\sigma^2$ is 1.0, 1.1, . . . , 1.9 for a weight of each frame of data, respectively. The bias b of each frame of data is initialized to 0.

Step 3e): the four-channel road information $(R_i', G_i', B_i', Q_i')$ is input to a trained semantic segmentation network 3D-LaneNet, and the image of the lane candidate region 2 is output.

Step 4): the lane candidate region 1 and the lane candidate region 2 are fused, and the two lane candidate regions are combined into a final lane region.

The present invention provides a lane detection system based on vision and lidar multi-level fusion. The system includes a lidar, a vehicle-mounted camera, and a lane detection module. The lane detection module includes a semantic segmentation network 3D-LaneNet, a calibration unit, a first lane candidate region detection unit, a second lane candidate region detection unit, and a lane fusion unit.

The lidar is configured to obtain point cloud data.

The vehicle-mounted camera is configured to obtain a video image.

The calibration unit is configured to calibrate the obtained point cloud data and the obtained video image.

The first lane candidate region detection unit is configured to construct a point cloud clustering model by fusing height information and reflection intensity information of the point cloud data and RGB information of the video image, obtain point clouds of a road based on the point cloud clustering model, and obtain a lane surface as a first lane candidate region by performing least square fitting on the point clouds of the road.

The second lane candidate region detection unit is configured to obtain four-channel road information by fusing the reflection intensity information of the point cloud data and the RGB information of the video image, input the four-channel road information into the semantic segmentation network 3D-LaneNet, and output an image of a second lane candidate region.

The lane fusion unit is configured to fuse the first lane candidate region and the second lane candidate region, and combine the two lane candidate regions into a final lane region.

The present invention also provides a terminal device, including at least one processor, a memory, at least one network interface, and a user interface. Various components are coupled together through a bus system. Understandably, the bus system is configured to communicate between these components. The bus system includes not only a data bus but also a power bus, a control bus, and a state signal bus. But for clarity, various buses are labeled into a bus system in the figures.

The user interface may include a display, a keyboard, or a clickable device, such as, a mouse, a track ball, a touch pad, or a touch screen and others.

It should be understood that the memory in the embodiment of the present invention may be either a volatile memory or a non-volatile memory, or may include both the volatile memory and the non-volatile memory. Specifically, the non-volatile memory may be a read-only memory (ROM), a programmable ROM (PROM), an erasable PROM (EPROM), an electrically EPROM (EEPROM), or a flash memory. The volatile memory may be a random access memory (RAM), which serves as an external cache. Through exemplary but not restrictive description, many forms of RAMs are available, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM). The memory described herein is intended to include, but is not limited to, these and any other suitable types of memories.

In some implementations, the memory stores the following elements: executable modules, or data structures, or their subsets, or sets of their extensions, namely operating systems and applications.

Specifically, the operating systems include various system programs, such as a framework layer, a core library layer, a driver layer and the like, which are configured to implement various basic services and process hardware-based tasks. The applications include various applications, such as a media player, a browser and the like, which are configured to achieve various application services. The programs that implement the method according to the embodiment of the present invention may be included in the applications.

By executing programs or instructions stored in a memory, which may specifically be programs or instructions stored in an application, the processor is configured to perform the steps of the method according to the present invention.

The method according to the present invention may be applied to the processor or implemented by the processor. The processor may be an integrated circuit chip with the capability to process signals. During the implementation, the steps of the above method can be completed through an integrated logic circuit of the hardware in the processor or instructions in the form of software. The above processor may be a general-purpose processor, a digital signal processor (DSP), an application specific integrated circuit (ASIC), a field-programmable gate array (FPGA), or other programmable logic devices, discrete gates or transistor logic devices, or discrete hardware components. Each method, step, and logical block diagram disclosed in the present invention may be implemented or executed. The general-purpose processor may be a microprocessor, or the processor may be any conventional processor, etc. The steps in combination with the method disclosed in Embodiment 1 may be executed and completed by a hardware decoder processor directly, or by a combination of a hardware and a software module in a decoder processor. The software module may be located in a RAM, a flash memory, a ROM, a PROM, an EEPROM, a register, and other available storage media in the art. The storage media are located in the memory, and the processor reads information in the memory to complete the steps of the above method in combination with its hardware.

It should be understood that the embodiments described in the present invention may be implemented by means of hardware, software, firmware, middleware, microcode, or a combination thereof. With respect to hardware implementations, the processing unit may be implemented in at least one of a application specific integrated circuit (ASIC), a digital signal processor (DSP), a digital signal process device (DSPD), a programmable logic device (PLD), a field-programmable gate array (FPGA), a general-purpose processor, a controller, a microcontroller, a microprocessor, other electronic units for performing the functions described in the present invention and a combination thereof.

With respect to software implementations, the present invention can be implemented by executing functional modules (such as procedures and functions) of the present invention. The software code can be stored in the memory and executed by the processor. The memory can be implemented inside or outside the processor.

The present invention provides a non-volatile storage medium configured to store a computer program. The steps of the method according to the present invention can be implemented when the computer program is executed by the processor.

Finally, it should be noted that the above embodiments are only intended to describe the technical solutions of the present invention, but not to limit the present invention. It should be understood by those having ordinary skill in the art that, although the present invention has been described in detail with reference to the embodiments, any modification or equivalent replacement made to the technical solutions of the present invention does not depart from the spirit and scope of the technical solutions of the present invention and shall fall within in the scope of the claims of the present invention.

What is claimed is:

1. A lane detection method based on vision and lidar multi-level fusion, comprising:
   calibrating point cloud data and a video image;
   constructing a point cloud clustering model by fusing height information, reflection intensity information of the point cloud data, and red, green, blue (RGB) information of the video image, obtaining point clouds of a road based on the point cloud clustering model, and obtaining a lane surface as a first lane candidate region by performing least square fitting on the point clouds of the road;
   obtaining four-channel road information by fusing the reflection intensity information of the point cloud data and the RGB information of the video image, inputting the four-channel road information into a trained semantic segmentation network 3D-LaneNet, and outputting an image of a second lane candidate region; and
   fusing the first lane candidate region and the second lane candidate region, and combining the first lane candidate region and the second lane candidate region into a final lane region;
   wherein the lane detection method is implemented by mounting a lidar and a vehicle-mounted camera on a vehicle.

2. The lane detection method according to claim 1, wherein the step of constructing the point cloud clustering model by fusing the height information, the reflection intensity information of the point cloud data, and the RGB information of the video image, obtaining the point clouds of the road based on the point cloud clustering model, and obtaining the lane surface as the first lane candidate region by performing least square fitting on the point clouds of the road further comprises:
   constructing the point cloud clustering model based on a constraint:

$E_i = \alpha(H_i - H_{i+1}) + \beta(Q_i - Q_{i+1}) + \gamma[(R_i - R_{i+1}) + (G_i - G_{i+1}) + (B_i - B_{i+1})]$, wherein, $E_i$ represents a similarity between an $i^{th}$ point and an $(i+1)^{th}$ point; $\alpha$, $\beta$, and $\gamma$ are weight coefficients; $H_i$ is a height of the $i^{th}$ point in the calibrated point cloud data, and $Q_i$ is a reflection intensity of the $i^{th}$ point in the calibrated point cloud data; and $R_i$, $G_i$, and $B_i$ are RGB three-channel values of an $i^{th}$ pixel in the video image, respectively;
   starting clustering by taking a point cloud closest to a central position of a head of the vehicle as a center point and using the point cloud clustering model, wherein when no new point is clustered or after all points in the point cloud are traversed, all point clouds obtained by final clustering are the point clouds of the road; and
   performing surface fitting on the point clouds of the road by using a least square method to obtain the lane surface as the first lane candidate region.

3. The lane detection method according to claim 2, wherein the trained semantic segmentation network 3D-LaneNet processes continuous multi-frame information simultaneously and extracts correlation features of the lane from the continuous multi-frame information; wherein the trained semantic segmentation network 3D-LaneNet comprises twelve 3D-P-Inception modules, wherein a first six 3D-P-Inception modules of the twelve 3D-P-Inception modules are configured for an encode stage, and a second six 3D-P-Inception modules of the twelve 3D-P-Inception modules are configured for a decode stage; wherein the twelve 3D-P-inception modules are obtained by replacing a two-dimensional convolution kernel in Inception-V2 modules with a three-dimensional convolution kernel, and 3D-max-pooling in the twelve 3D-P-Inception modules is replaced with 3D-AvgPooling; wherein convolution kernels of different sizes are used in the twelve 3D-P-Inception modules to facilitate extraction of multi-scale features of the lane.

4. The lane detection method according to claim 3, further comprising:
   training a semantic segmentation network 3D-LaneNet to obtain the trained semantic segmentation network 3D-LaneNet;
   wherein the step of training the semantic segmentation network 3D-LaneNet further comprises:
      creating a dataset as a training set using calibrated continuous multi-frame point clouds and video images;
      when consecutive ten frames of data are input, setting ten initial learning rates $a_{j0}=0.001$ for the ten frames of data, respectively, $j=1, 2, 3, \ldots 10$; setting a batch value used for each parameter updating as $b=2$, and setting a number of times of iterative training as $c=5000$; calculating a loss function value $L_j$ for each frame of fused data by using a cross entropy loss function, and determining a total loss function value $$L = \sum_{j=1}^{10} L_j;$$

initializing a weight W of the semantic segmentation network 3D-LaneNet by using Gaussian weight to follow a distribution $X \sim N(0, \sigma^2)$, wherein $\sigma^2$ is 1.0, 1.1, . . . , 1.9 for a weight of each frame of data, respectively; and initializing a bias of the each frame of data to 0;
      inputting samples of the training set into the semantic segmentation network 3D-LaneNet, and after completing an $n^{th}$ iterative training, calculating a ratio $$\alpha_n = L_{jn} / L_n$$

of each loss function to a total loss function, wherein $L_{jn}$ is a $j^{th}$ loss function in the $n^{th}$ iterative training, and $L_n$ is the total loss function; when $\alpha_n > 0.3$ updating a learning rate to $a_{jn} = a_{j0}*(1+\alpha_n)$ and when $\alpha_n < 0.03$, updating the learning rate to $a_{jn} = a_{j0}*(1-10\alpha_n)$; and
      after convergence of network parameters, obtaining the trained semantic segmentation network 3D-LaneNet.

5. The lane detection method according to claim 4, wherein the step of obtaining the four-channel road information by fusing the reflection intensity information of the point cloud data and the RGB information of the video image, inputting the four-channel road information into the trained semantic segmentation network 3D-LaneNet, and outputting the image of the second lane candidate region further comprises:
   representing the RGB information of the $i^{th}$ pixel of the video image by $(R_i, G_i, B_i)$, and performing data standardization on the RGB information $(R_i, G_i, B_i)$ of the $i^{th}$ pixel of the video image by using a Min-Max standardization method to obtain standardized RGB information $(R_i', G_i', B_i')$;

performing data standardization on the reflection intensity $Q_i$ of the $i^{th}$ point of the point cloud data by using a z-score standardization method to obtain standardized reflection intensity $Q_i'$; and fusing the standardized reflection intensity $Q_i'$ as fourth-channel information and the standardized RGB information $(R_i', G_i', B_i')$ as three-channel information to obtain the four-channel road information $(R_i', G_i', B_i', Q_i')$.

6. A lane detection system based on vision and lidar multi-level fusion, comprising a lidar, a vehicle-mounted camera, and a lane detection module, wherein the lane detection module comprises a semantic segmentation network 3D-LaneNet, a calibration unit, a first lane candidate region detection unit, a second lane candidate region detection unit, and a lane fusion unit; wherein the lidar is configured to obtain point cloud data;

the vehicle-mounted camera is configured to obtain a video image;

the calibration unit is configured to calibrate the point cloud data and the video image;

the first lane candidate region detection unit is configured to construct a point cloud clustering model by fusing height information, reflection intensity information of the point cloud data, and RGB information of the video image, obtain point clouds of a road based on the point cloud clustering model, and obtain a lane surface as a first lane candidate region by performing least square fitting on the point clouds of the road;

the second lane candidate region detection unit is configured to obtain four-channel road information by fusing the reflection intensity information of the point cloud data and the RGB information of the video image, input the four-channel road information into the semantic segmentation network 3D-LaneNet, and output an image of a second lane candidate region; and the lane fusion unit is configured to fuse the first lane candidate region and the second lane candidate region, and combine the first lane candidate region and the second lane candidate region into a final lane region.

7. The lane detection system according to claim 6, wherein the first lane candidate region detection unit is implemented as follows:

the point cloud clustering model is constructed based on a constraint:

$$E_i = \alpha(H_i - H_{i+1}) + \beta(Q_i - Q_{i+1}) + \gamma[(R_i - R_{i+1}) + (G_i - G_{i+1}) + (B_i - B_{i+1})],$$

wherein, $E_i$ represents a similarity between an $i^{th}$ point and an $(i+1)^{th}$ point; $\alpha$, $\beta$, and $\gamma$ are weight coefficients; $H_i$ is a height of the $i^{th}$ point in the calibrated point cloud data, and $Q_i$ is a reflection intensity of the $i^{th}$ point in the calibrated point cloud data; and $R_i$, $G_i$, and $B_i$ are RGB three-channel values of an $i^{th}$ pixel in the video image, respectively;

clustering starts by taking a point cloud closest to a central position of a head of the vehicle as a center point and using the point cloud clustering model, wherein when no new point is clustered or after all points in the point cloud are traversed, all point clouds obtained by final clustering are the point clouds of the road; and surface fitting is performed on the point clouds of the road by using a least square method to obtain the lane surface as the first lane candidate region.

8. The lane detection system according to claim 7, wherein the trained semantic segmentation network 3D-LaneNet processes continuous multi-frame information simultaneously and extracts correlation features of the lane from the continuous multi-frame information; wherein the trained semantic segmentation network 3D-LaneNet comprises twelve 3D-P-Inception modules, wherein a first six 3D-P-Inception modules of the twelve 3D-P-Inception modules are configured for an encode stage, and a second six 3D-P-Inception modules of the twelve 3D-P-Inception modules are configured for a decode stage; wherein the twelve 3D-P-inception modules are obtained by replacing a two-dimensional convolution kernel in Inception-V2 modules with a three-dimensional convolution kernel, and 3D-max-pooling in the twelve 3D-P-Inception modules is replaced with 3D-AvgPooling; wherein convolution kernels of different sizes are used in the twelve 3D-P-Inception modules to facilitate extraction of multi-scale features of the lane.

9. The lane detection system according to claim 8, wherein the semantic segmentation network 3D-LaneNet is trained as follows:

a dataset is created as a training set using calibrated continuous multi-frame point clouds and video images;

when consecutive ten frames of data are input, ten initial learning rates $a_{j0}=0.001$ are set for the ten frames of data, respectively, $j=1, 2, 3, \ldots 10$; a batch value used for each parameter updating is set as $b=2$, and a number of times of iterative training is set as $c=5000$; a loss function value $L_j$ for each frame of fused data is calculated by using a cross entropy loss function, and a total loss function value $$L = \sum_{j=1}^{10} L_j$$

is determined; a weight W of the semantic segmentation network 3D-LaneNet is initialized by using Gaussian weight to follow a distribution $X \sim N(0, \sigma^2)$, wherein $\sigma^2$ is 1.0, 1.1, $\ldots$, 1.9 for a weight of each frame of data, respectively; and a bias of the each frame of data is initialized to 0;

samples of the training set are input into the 3D-LaneNet, and after completing an $n^{th}$ iterative training, a ratio $$\alpha_n = L_{jn} / L_n$$

of each loss function to a total loss function is calculated, wherein $L_{jn}$ is a $j^{th}$ loss function in the $n^{th}$ iterative training, and $L_n$ is the total loss function; when $\alpha_n > 0.3$ a learning rate is updated to $a_{jn} = a_{j0} * (1 + \alpha_n)$ and when $\alpha_n < 0.03$ the learning rate is updated to $\alpha_{jn} = a_{j0} * (1 - 10\alpha_n)$; and after convergence of network parameters, the trained semantic segmentation network 3D-LaneNet is obtained.

10. The lane detection system according to claim 9, wherein the second lane candidate region detection unit is implemented as follows:

the RGB information of the $i^{th}$ pixel of the video image is represented by $(R_i, G_i, B_i)$, and data standardization is performed on the RGB information $(R_i, G_i, B_i)$ of the $i^{th}$ pixel of the video image by using a Min-Max standardization method to obtain standardized RGB information $(R_i', G_i', B_i')$;

data standardization is performed on the reflection intensity $Q_i$ of the $i^{th}$ point of the point cloud data by using a z-score standardization method to obtain standardized reflection intensity $Q_i'$; and the standardized reflection intensity Q as fourth-channel information and the standardized RGB information $(R_i',G_i',B_i')$ as three-channel information are fused to obtain the four-channel road information $(R_i', G_i', B_i', Q_i')$.

* * * * *